United States Patent
Killebrew

(10) Patent No.: US 11,052,854 B2
(45) Date of Patent: Jul. 6, 2021

(54) TEMPERATURE SENSING CHILD SAFETY SEAT

(71) Applicant: Franklin Killebrew, Ft Washington, MD (US)

(72) Inventor: Franklin Killebrew, Ft Washington, MD (US)

( * ) Notice: Subject to any disclaimer, the term of this patent is extended or adjusted under 35 U.S.C. 154(b) by 0 days.

(21) Appl. No.: 16/150,376

(22) Filed: Oct. 3, 2018

(65) Prior Publication Data

US 2020/0108789 A1   Apr. 9, 2020

(51) Int. Cl.

| G08B 23/00 | (2006.01) |
|---|---|
| B60R 21/015 | (2006.01) |
| B60N 2/28 | (2006.01) |
| G08B 21/02 | (2006.01) |
| G08B 21/04 | (2006.01) |
| B60N 2/00 | (2006.01) |

(52) U.S. Cl.
CPC ........ *B60R 21/01556* (2014.10); *B60N 2/002* (2013.01); *B60N 2/286* (2013.01); *B60N 2/2845* (2013.01); *B60R 21/01538* (2014.10); *G08B 21/0211* (2013.01); *G08B 21/0461* (2013.01)

(58) Field of Classification Search
CPC ........ B60R 21/01556; B60R 21/01538; B60N 2/002; B60N 2/2845; B60N 2/286; G08B 21/0211; G08B 21/0461
USPC ....................................................... 340/573.1
See application file for complete search history.

(56) References Cited

U.S. PATENT DOCUMENTS

| 4,851,822 | A | | 7/1989 | Barnett | |
|---|---|---|---|---|---|
| 5,007,674 | A | * | 4/1991 | Franc | A47D 15/00 297/184.13 |
| D383,912 | S | | 9/1997 | Meeker | |
| 6,139,100 | A | * | 10/2000 | Baskin-Lockman | B60N 2/2851 297/219.12 |
| 6,922,147 | B1 | * | 7/2005 | Viksnins | B60N 2/002 340/573.1 |
| 7,701,358 | B1 | | 4/2010 | White | |
| 8,217,796 | B2 | | 7/2012 | Trummer | |
| 8,618,926 | B1 | | 12/2013 | Thompson | |
| 9,139,128 | B1 | * | 9/2015 | Lemons | B60R 21/01516 |
| 9,384,647 | B1 | | 7/2016 | Arnold | |
| 9,550,454 | B1 | * | 1/2017 | Roisen | G08B 21/0277 |
| 9,569,948 | B1 | * | 2/2017 | Platt | G08B 21/22 |
| 9,845,050 | B1 | * | 12/2017 | Garza | B60Q 9/00 |
| 10,239,448 | B1 | * | 3/2019 | Samuel, Jr. | B60N 2/26 |

(Continued)

*Primary Examiner* — Zhen Y Wu
(74) *Attorney, Agent, or Firm* — The Iwashko Law Firm, PLLC; Lev Ivan Gabriel Iwashko

(57) ABSTRACT

A temperature sensing child safety seat for preventing hyperthermia and hypothermia includes a safety seat that is configured to secure a child in a vehicle. The safety seat comprises a base that defines an interior space. A power module, a microprocessor, and a communications module are coupled to the base and positioned in the interior space. A plurality of sensors is coupled to the safety seat. The microprocessor is operationally coupled to the power module, the communications module, and the sensors. The sensors are configured to measure a temperature and to communicate a temperature reading to the microprocessor. The microprocessor is positioned, in an event the temperature reading deviates from a prespecified range, to compel the communications module to alert emergency personnel.

13 Claims, 4 Drawing Sheets

(56) References Cited

U.S. PATENT DOCUMENTS

| | | | |
|---|---|---|---|
| 2005/0137462 A1* | 6/2005 | Cho | B60N 2/0252 600/300 |
| 2007/0096891 A1 | 5/2007 | Sheriff | |
| 2011/0089729 A1* | 4/2011 | Gibree | B60N 2/2806 297/217.4 |
| 2012/0299340 A1* | 11/2012 | Krasley | A47C 7/68 297/188.14 |
| 2013/0194089 A1 | 8/2013 | Estrada | |
| 2014/0346200 A1* | 11/2014 | Strickland | A47D 13/02 224/158 |
| 2016/0379459 A1* | 12/2016 | Trang | G08B 21/24 340/457 |
| 2017/0065098 A1* | 3/2017 | Taylor | B60N 2/2881 |
| 2017/0259720 A1* | 9/2017 | Lombardi | B62B 7/145 |
| 2018/0354443 A1* | 12/2018 | Ebrahimi | B60N 2/2812 |
| 2019/0243397 A1* | 8/2019 | Spes | G08B 21/0205 |

\* cited by examiner

TEMPERATURE SENSING CHILD SAFETY SEAT

BACKGROUND OF THE INVENTION (1) Field of the Invention (2) Description of Related Art Including Information Disclosed Under 37 CFR 1.97 and 1.98

The disclosure and prior art relate to child safety seats and more particularly pertains to a new child safety seat for preventing hyperthermia and hypothermia.

BRIEF SUMMARY OF THE INVENTION

An embodiment of the disclosure meets the needs presented above by generally comprising a safety seat that is configured to secure a child in a vehicle. The safety seat comprises a base that defines an interior space. A power module, a microprocessor, and a communications module are coupled to the base and positioned in the interior space. A plurality of sensors is coupled to the safety seat. The microprocessor is operationally coupled to the power module, the communications module, and the sensors. The sensors are configured to measure a temperature and to communicate a temperature reading to the microprocessor. The microprocessor is positioned, in an event the temperature reading deviates from a prespecified range, to compel the communications module to alert emergency personnel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
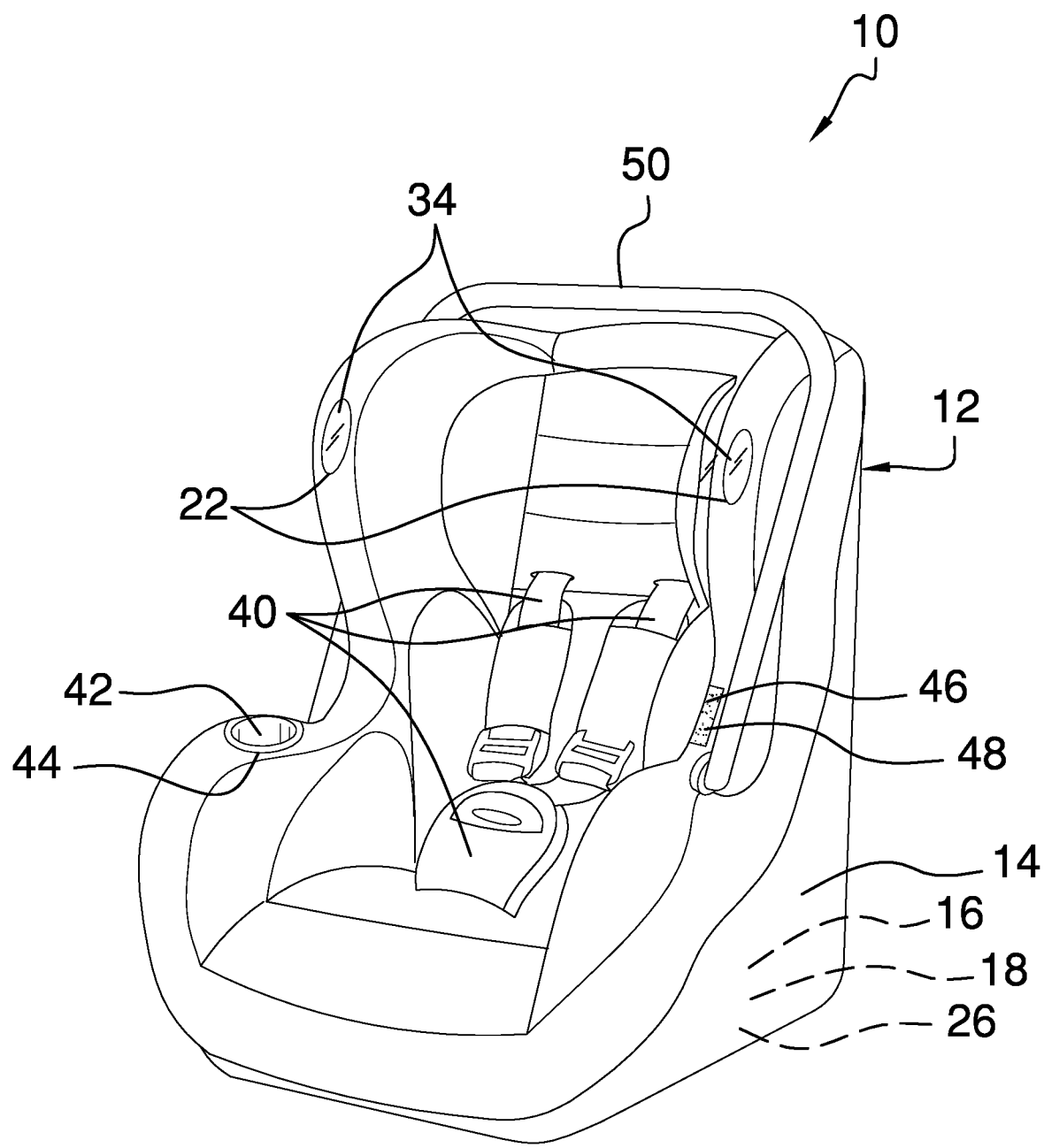
FIG. 1 is an isometric perspective view of a temperature sensing child safety seat according to an embodiment of the disclosure.
Figure 2:
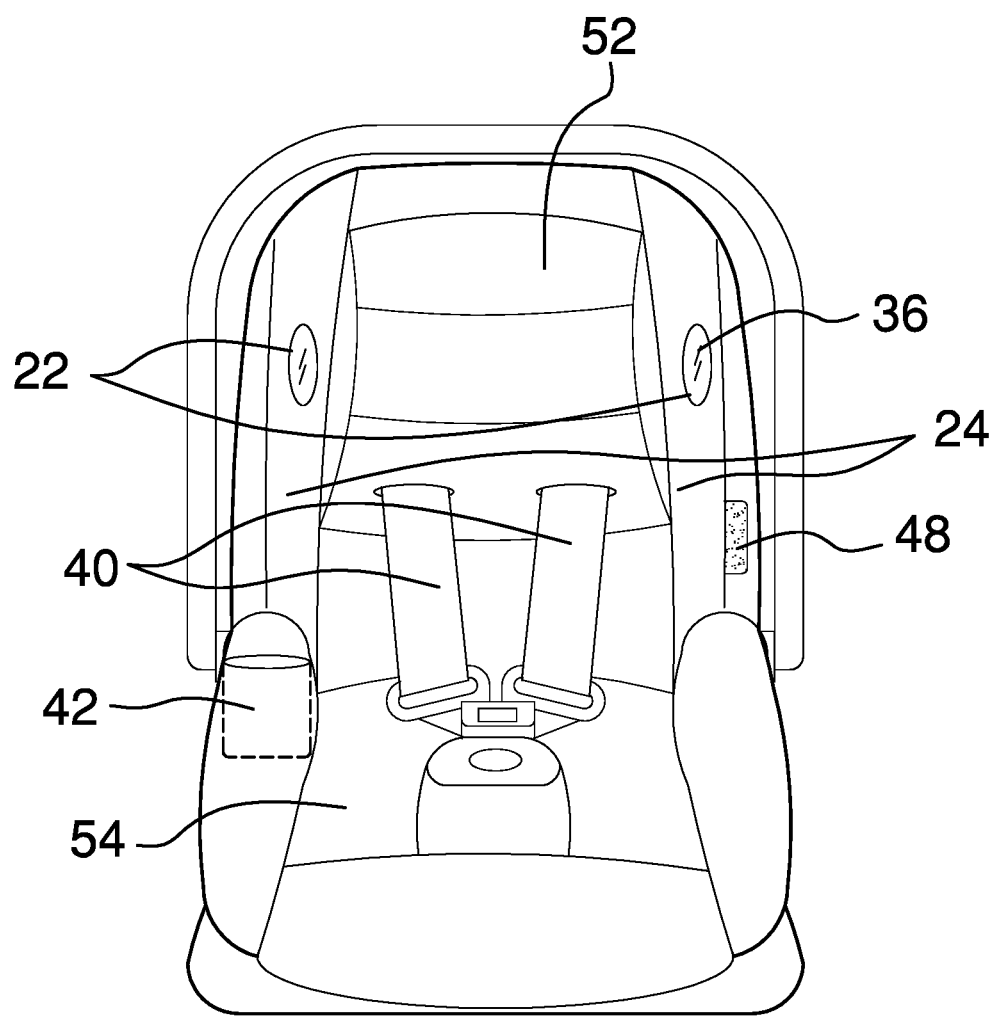
FIG. 2 is a front view of an embodiment of the disclosure.
Figure 3:
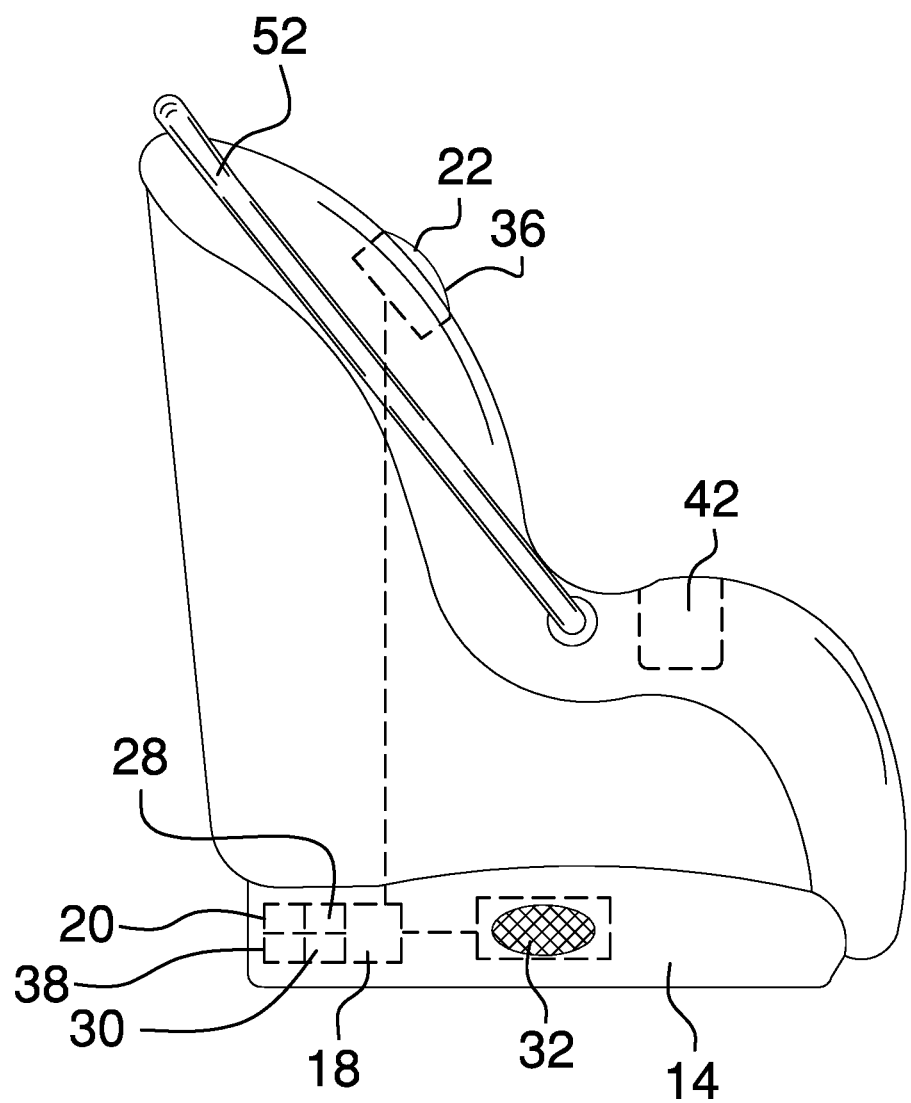
FIG. 3 is a side view of an embodiment of the disclosure.
Figure 4:
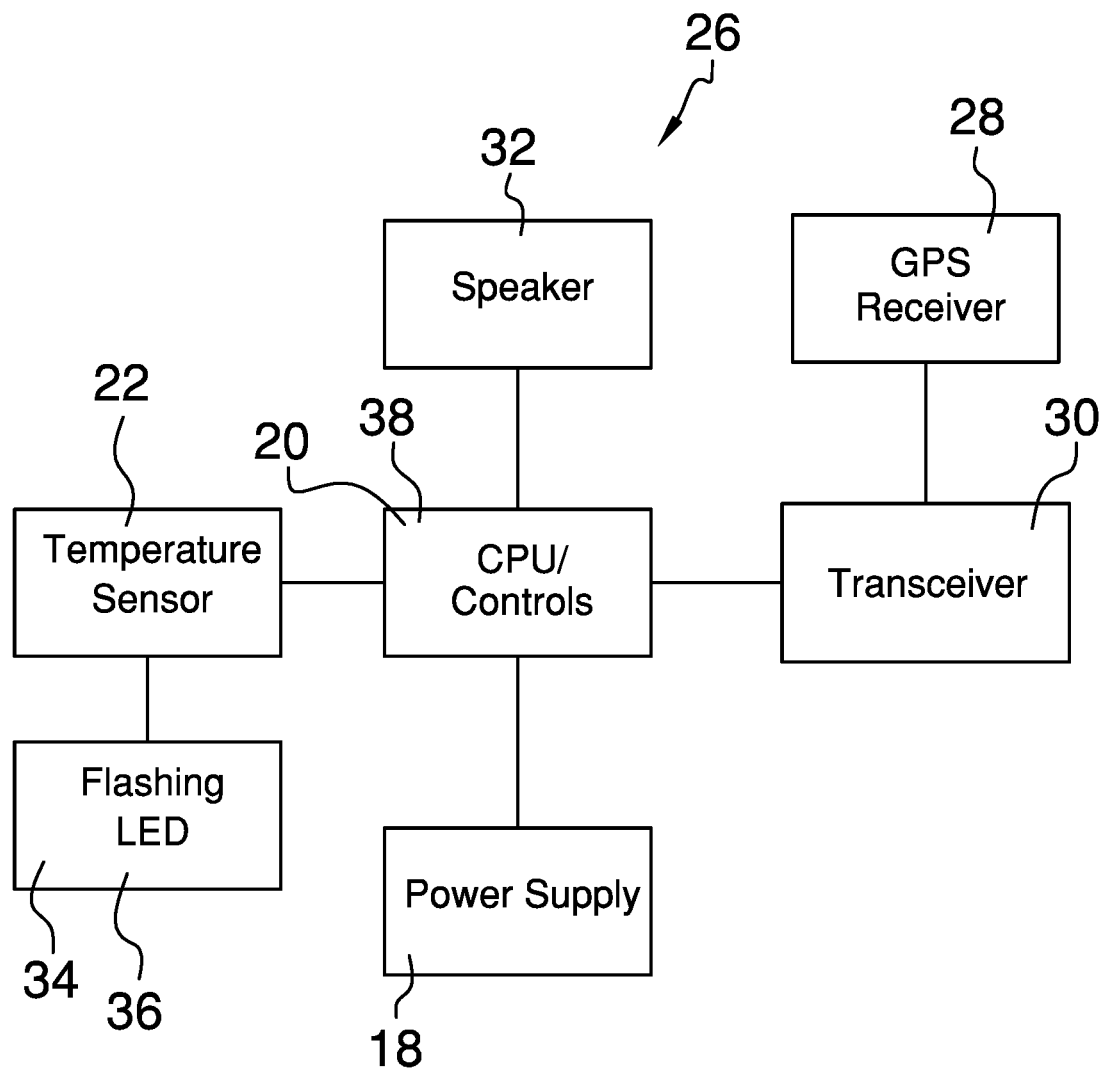
FIG. 4 is a block diagram of an embodiment of the disclosure.

With reference now to the drawings, and in particular to FIGS. 1 through 4 thereof, a new child safety seat embodying the principles and concepts of an embodiment of the disclosure and generally designated by the reference numeral 10 will be described.

As best illustrated in FIGS. 1 through 4, the temperature sensing child safety seat 10 generally comprises a safety seat 12 that is configured to secure a child in a vehicle. The safety seat 12 comprises a base 14 that defines an interior space 16. A power module 18 and a microprocessor 20 are coupled to the base 14 and positioned in the interior space 16. The microprocessor 20 is operationally coupled to the power module 18.

A plurality of sensors 22 is coupled to the safety seat 12. More specifically, referring to FIGS. 1 through 3, a first portion of each of the plurality of sensors 22 may be disposed within at least a portion of the safety seat 12 and a second portion of each of the plurality of sensors 22 may be disposed outside of the safety seat 22 and protrudes away from a surface of the safety seat 22. Also, referring to FIG. 3, the first portion of each of the plurality of sensors 22 may include a first planar side, a second planar side, and a third planar side. The first planar side may be disposed on a first end of the second portion and extend away from the second portion with respect to a first direction. The second planar side may be perpendicularly disposed at a first end away from the first planar side with respect to a second direction. The third planar side may be perpendicularly disposed away from a second end of the second planar side with respect to a third direction, such that the third planar side is parallel to the first planar side. Consequently, the third planar side may be disposed on a second end of the second portion. Moreover, the second portion of each of the plurality of sensors 22 may include a convex and/or arcuate portion extending away from the surface of the safety seat 22. Additionally, referring to FIGS. 1 and 2, the second portion of each of the plurality of sensors 22 may have an oval shape. The sensors 22 are operationally coupled to the microprocessor 20. The sensors 22 are configured to measure a temperature and to communicate a temperature reading to the microprocessor 20. The plurality of sensors 22 comprises two sensors 22 that are positioned singly on opposing sides 24 of the safety seat 12.

A communications module 26 is coupled to the base 14 and is positioned in the interior space 16. The communications module 26 is operationally coupled to the microprocessor 20. The microprocessor 20 is positioned, in an event the temperature reading deviates from a prespecified range, to compel the communications module 26 to alert emergency personnel. Providing an alert to the emergency personnel provides an opportunity to rescue the child prior before the child becomes hypothermic (i.e. a decrease in body temperature below normal) or hyperthermic (i.e. an increase in body temperature above normal).

The communications module 26 comprises a receiver 28 and a transceiver 30. The receiver 28 is Global Positioning System enabled and is configured to receive position coordinates of the child. The microprocessor 20 is positioned to selectively command the transceiver 30 to communicate the alert and the coordinates of the child to the emergency personnel.

A speaker 32 is coupled to the base 14. More specifically, referring to FIG. 3, at first portion of the speaker 32 may be disposed within the base 14 and a second portion of the speaker 32 may be disposed on an outer surface of the base 14, such that a length and width of the first portion of the speaker 32 is greater than a length and width of the second portion. The microprocessor 20 is positioned to selectively actuate the speaker 32 to broadcast a signal from the emergency personnel. In this way, the emergency personnel can speak to and reassure the child that help is on the way.

Each of a plurality of bulbs 34 is coupled to the safety seat 12 proximate to a respective sensor 22. Referring again to FIGS. 1 through 3, each of the plurality of bulbs 34 may have a shape that corresponds to a shape of the second portion of each of the plurality of sensors 22 (i.e. oval shape), and include a convex and/or arcuate portion extending away from the surface of the safety seat 22. The microprocessor 20 is positioned to selectively couple the bulbs 34 to the power module 18 in the event the temperature reading deviates from the prespecified range to provide a visual alert to a person proximate to the vehicle. Each bib 34 comprises a light emitting diode 36 that is configured to flash to alert the person proximate to the vehicle. The visual alert provides an opportunity for the person proximate to the vehicle to provide or seek assistance in rescuing the child.

A controller 38 operationally coupled to said microprocessor 20 and is configured to allow a user to input commands, such as the prespecified temperature range, into said microprocessor 20.

A plurality of straps 40 is coupled to the safety seat 12. The straps 40 are configured to position around the child to couple the child to the safety seat 12. A recess 42 extends into an armrest 44 of the safety seat 12 and is configured to position an object, such as a cup. A coupler 46 is coupled to the safety seat 12 and is configured to couple to an item, such as a toy, to couple the item to the safety seat 12. The coupler 46 comprises one half of a hook and loop fastener 48.

A bar 50 is pivotally coupled to and extends between the opposing sides 24 of the safety seat 12. The bar 50 is substantially C-shaped and is configured to selectively position in an open configuration, to place the child in the safety seat 12, and a closed configuration to retain the child in the safety seat 12.

The present invention also anticipates that the safety seat 12 is positionable in both a rear facing configuration and a front facing configuration, and that the safety seat 12 comprises a backrest 52 that is detachable so that a seat section 54 of the safety seat 12 so that the seat section 54 is configured to position a toddler, allowing a safety belt of the vehicle to be properly securable around the toddler.

In use, the sensor 22 measures the temperature and communicates the temperature reading to the microprocessor 20. In the event the temperature reading deviates from the prespecified range, the microprocessor 20 commands the transceiver 30 to communicate the alert and the coordinates of the child to the emergency personnel.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A temperature sensing child safety seat comprising:
   a safety seat configured for securing a child in a vehicle, the safety seat comprising a base, the base defining an interior space;
   a power module coupled to the base and positioned in the interior space;
   a microprocessor coupled to the base and positioned in the interior space, the microprocessor being operationally coupled to the power module;
   a plurality of sensors coupled to the safety seat, the sensors being operationally coupled to the microprocessor, the sensors being configured for measuring a temperature and for communicating a temperature reading to the microprocessor, the plurality of sensors comprising two sensors positioned singly on opposing sides of the safety seat such that each of said two sensors is configured to face forward relative to the child positioned in said safety seat, such that a first portion of each of the plurality of sensors is disposed within the safety seat and a second portion of each of the plurality of sensors is disposed outside of the safety seat and protrudes away from a surface of the safety seat, such that the second portion of each of the plurality of sensors is configured to flash through at least the second portion to alert a person proximate to the vehicle in an event the temperature reading deviates from a prespecific range; and
   a communications module coupled to the base and positioned in the interior space, the communications module being operationally coupled to the microprocessor wherein the microprocessor is positioned, in the event the temperature reading deviates from the prespecified range, to compel the communications module for alerting emergency personnel.

2. The seat of claim 1, further including the communications module comprising:
   a receiver, the receiver being Global Positioning System enabled wherein the receiver is configured for receiving position coordinates of the child; and a transceiver wherein the microprocessor is positioned for selectively commanding the transceiver for communicating an alert and the coordinates of the child to the emergency personnel.

3. The seat of claim 2, further including a speaker coupled to the base wherein the microprocessor is positioned for selectively actuating the speaker for broadcasting a signal from the emergency personnel.

4. The seat of claim 1, further including a plurality of bulbs, each bulb being coupled to the safety seat proximate to a respective sensor wherein the microprocessor is positioned for selectively coupling the bulbs to the power module in the event the temperature reading deviates from the prespecified range for providing a visual alert to the person proximate to the vehicle.

5. The seat of claim 4, further including each bulb comprising a light emitting diode.

6. The seat of claim 2, further including a controller operationally coupled to said microprocessor wherein said controller is configured for inputting commands into said microprocessor.

7. The seat of claim 1, further including a plurality of straps coupled to the safety seat wherein the straps are configured for positioning around the child for coupling the child to the safety seat.

8. The seat of claim 1, further including a recess extending into an armrest of the safety seat wherein the recess is configured for positioning an object.

9. The seat of claim 1, further including a coupler coupled to the safety seat wherein the coupler is configured for coupling to an item for coupling the item to the safety seat.

10. The seat of claim 9, further including the coupler comprising one half of a hook and loop fastener.

11. The seat of claim 1, further including a bar pivotally coupled to and extending between the opposing sides of the safety seat, the bar being substantially C-shaped wherein the bar is configured for selectively positioning in an open configuration for placing the child in the safety seat and a closed configuration for retaining the child in the safety seat.

12. The seat of claim 1, wherein the second portion has an oval shape and protrudes away from the surface of the safety seat in a convex shape.

13. A temperature sensing child safety seat comprising:
   a safety seat configured for securing a child in a vehicle, the safety seat comprising a base, the base defining an interior space;
   a power module coupled to the base and positioned in the interior space;
   a microprocessor coupled to the base and positioned in the interior space, the microprocessor being operationally coupled to the power module;
   a plurality of sensors coupled to the safety seat, the sensors being operationally coupled to the microprocessor, the sensors being configured for measuring a temperature and for communicating a temperature reading to the microprocessor, the plurality of sensors comprising two sensors positioned singly on opposing sides of the safety seat such that each of said two sensors is configured to face forward relative to the child positioned in said safety seat, such that a first portion of each of the plurality of sensors is disposed within the safety seat and a second portion of each of the plurality of sensors is disposed outside of the safety seat and protrudes away from a surface of the safety seat, such that the second portion has an oval shape, such that the second portion of each of the plurality of sensors is configured to flash through at least the second portion to alert a person proximate to the vehicle in an event the temperature reading deviates from a prespecific range;
   a communications module coupled to the base and positioned in the interior space, the communications module being operationally coupled to the microprocessor wherein the microprocessor is positioned, in the event the temperature reading deviates from the prespecified range, to compel the communications module for alerting emergency personnel, the communications module comprising:
      a receiver, the receiver being Global Positioning System enabled wherein the receiver is configured for receiving position coordinates of the child,
      a transceiver wherein the microprocessor is positioned for selectively commanding the transceiver for communicating an alert and the coordinates of the child to the emergency personnel,
      a speaker coupled to the base wherein the microprocessor is positioned for selectively actuating the speaker for broadcasting a signal from the emergency personnel,
      a plurality of bulbs, each bulb being coupled to the safety seat proximate to a respective sensor wherein the microprocessor is positioned for selectively coupling the bulbs to the power module in the event the temperature reading deviates from the prespecified range, each bulb comprising a light emitting diode, and a controller operationally coupled to said microprocessor wherein said controller is configured for inputting commands into said microprocessor; a plurality of straps coupled to the safety seat wherein the straps are configured for positioning around the child for coupling the child to the safety seat; a recess extending into an armrest of the safety seat wherein the recess is configured for positioning an object; a coupler coupled to the safety seat wherein the coupler is configured for coupling to an item for coupling the item to the safety seat, the coupler comprising one half of a hook and loop fastener; and
   a bar pivotally coupled to and extending between the opposing sides of the safety seat, the bar being substantially C-shaped wherein the bar is configured for selectively positioning in an open configuration for placing the child in the safety seat and a closed configuration for retaining the child in the safety seat.

\* \* \* \* \*